(12) United States Patent
Hayakawa et al.

(10) Patent No.: US 10,461,294 B2
(45) Date of Patent: Oct. 29, 2019

(54) SEPARATOR FOR ALKALINE BATTERIES, AND ALKALINE BATTERY USING SAME

(71) Applicant: Kuraray Co., Ltd., Kurashiki-shi (JP)

(72) Inventors: Tomohiro Hayakawa, Okayama (JP); Hiroyuki Kawai, Okayama (JP)

(73) Assignee: KURARAY CO., LTD., Kurashiki-shi (JP)

(*) Notice: Subject to any disclaimer, the term of this patent is extended or adjusted under 35 U.S.C. 154(b) by 46 days.

(21) Appl. No.: 15/267,604

(22) Filed: Sep. 16, 2016

(65) Prior Publication Data

US 2017/0005311 A1  Jan. 5, 2017

Related U.S. Application Data

(63) Continuation of application No. PCT/JP2015/058925, filed on Mar. 24, 2015.

(30) Foreign Application Priority Data

Mar. 25, 2014 (JP) ................................ 2014-061244

(51) Int. Cl.
*H01M 2/16* (2006.01)
*H01M 6/04* (2006.01)

(52) U.S. Cl.
CPC ......... *H01M 2/1626* (2013.01); *H01M 2/162* (2013.01); *H01M 6/045* (2013.01); *H01M 2/1606* (2013.01); *H01M 2/1686* (2013.01)

(58) Field of Classification Search
CPC .... H01M 2/162; H01M 6/045; H01M 2/1626; H01M 2/1606; H01M 2/1686
USPC ................. 429/246, 247, 249, 255
See application file for complete search history.

(56) References Cited

U.S. PATENT DOCUMENTS

| | | | |
|---|---|---|---|
| 5,290,645 | A | 3/1994 | Tanaka et al. |
| 6,875,508 | B1 | 4/2005 | Nambu et al. |
| 7,532,455 | B2 | 5/2009 | Mitchell |
| 7,914,920 | B2 | 3/2011 | Davis et al. |
| 8,048,556 | B2 | 11/2011 | Davis et al. |
| 8,288,034 | B2 | 10/2012 | Davis et al. |
| 2005/0079424 | A1 | 4/2005 | Davis et al. |
| 2006/0121340 | A1 | 6/2006 | Kawai et al. |
| 2007/0232175 | A1* | 10/2007 | Katayama ............... D01F 6/805 442/364 |
| 2007/0242415 | A1* | 10/2007 | Mitchell ............... C08B 37/003 361/314 |
| 2009/0017385 | A1* | 1/2009 | Harada ............... H01M 2/1613 429/255 |
| 2011/0143182 | A1 | 6/2011 | Davis et al. |
| 2012/0034508 | A1 | 2/2012 | Davis et al. |

FOREIGN PATENT DOCUMENTS

| | | |
|---|---|---|
| CN | 1118940 A | 3/1996 |
| CN | 1689177 A | 10/2005 |
| CN | 101065522 A | 10/2007 |
| CN | 101128948 A | 2/2008 |
| EP | 0 696 822 A1 | 2/1996 |
| EP | 1 179 627 A1 | 2/2002 |
| EP | 1 542 295 A1 | 6/2005 |
| EP | 1 795 632 A1 | 6/2007 |
| JP | 6-223800 | 8/1994 |
| JP | 9-199100 | 7/1997 |
| JP | 10-144282 | 5/1998 |
| JP | 2004-253196 | 9/2004 |
| JP | 2007-507850 | 3/2007 |
| JP | 2008-21497 | 1/2008 |
| WO | WO 00/52252 A1 | 9/2000 |
| WO | WO 2005/038961 A2 | 4/2005 |

OTHER PUBLICATIONS

Extended European Search Report dated Aug. 8. 2017 in Patent Application No. 15767746.9.
International Search Report dated May 19, 2015 in PCT/JP2015/058925, filed Mar. 24, 2015 (with English Translation).
Combined Chinese Office Action and Search Report dated Mar. 30, 2018 in Patent Application No. 201580015849.9 (with English language translation of Search Report only).
Office Action dated Dec. 5, 2018, in Chinese Patent Application No. 201580015849.9, filed Mar. 24, 2015 (with English-language Translation).
Notification of Reasons for Refusal dated Nov. 6, 2018 in Japanese Patent Application No. 2016-510385 filed on Mar. 24, 2015 (w/ English language Translation).
Japanese Office Action dated May 28, 2019, in Japanese Patent Application No. 2016-510385 (with English Translation).

* cited by examiner

*Primary Examiner* — Jonathan G Jelsma
*Assistant Examiner* — Omar M Kekia
(74) *Attorney, Agent, or Firm* — Oblon, McClelland, Maier & Neustadt, L.L.P.

(57) ABSTRACT

Provided are an alkaline battery separator suitably used for an alkaline battery, and an alkaline battery using the separator. The separator includes a nonwoven fabric including subject fibers; at least a part of the subject fibers containing a chelate forming fiber having a chelate formable functional group being capable of forming a chelate with a metal ion. The alkaline battery includes a positive electrode, a negative electrode, the above-described separator placed therebetween, and an electrolyte.

16 Claims, No Drawings

SEPARATOR FOR ALKALINE BATTERIES, AND ALKALINE BATTERY USING SAME

CROSS REFERENCE TO THE RELATED APPLICATIONS

This application is a continuation application, under 35 U.S.C. § 111(a), of international application No. PCT/JP2015/058925, filed Mar. 24, 2015, which claims priority to Japanese Patent Application No. 2014-061244 filed Mar. 25, 2014, the entire disclosure of which is herein incorporated by reference as a part of this application.

FIELD OF THE INVENTION

This invention relates to a separator for alkaline batteries, the separator being suitably usable for alkaline batteries (primary batteries), and an alkaline battery using the separator.

BACKGROUND OF THE INVENTION

The alkaline battery comprises an alkaline aqueous solution, such as a potassium hydroxide aqueous solution, as an electrolyte and also comprises a positive electrode and a negative electrode separated electrically from each other by a separator.

The negative electrode comprises negative electrode active materials, such as zinc, that generate electrons while being oxidized (oxidation reaction). The positive electrode comprises positive electrode active materials, such as manganese dioxide, which absorbs electrons via reduction reaction.

Thereby, in the alkaline battery, chemical energy generated in connection with oxidation-reduction reaction is taken out as electric energy.

Such an alkaline battery separator needs to meet various requirements. For instance, such a separator should: (1) prevent internal short-circuiting between the positive electrode and the negative electrode; (2) have satisfactory electrolyte absorption capacity to cause sufficient electrogenic reactions, while having good ionic conductivity as well as low electric resistance; (3) occupy a small space when incorporated into a battery so as to increase the amounts of positive and negative electrode active materials (and therefore increasing the battery life); and (4) withstand, after incorporated into a battery, buckling caused by impacts due to vibrations or accidental drops during transport or handling, which may lead to internal short-circuiting of the battery.

In recent years, the popularization of digital equipment requires novel alkaline batteries having further improved discharge performance. It is possible to enhance the discharge performance of a battery by using a thinner separator in order to increase an amount of active materials to be added, but such a thinner separator may facilitate short circuit caused by penetration of a metallic crystal. Moreover, larger amount of active materials to be added and others may increase in amount of metal impurities in the active materials. For example, metals, such as copper, contained in positive electrode active materials as well as in impurities of the positive electrode active materials may ionize so as to precipitate on the negative electrode side. The precipitated metals may become the cause of a short circuit.

In order to solve such a problem, Patent Document 1 (JP Laid-open Patent Publication No. 2007-507850) describes a battery including a separator having a trapping layer. As the trapping layer, there is described a solvent- and ion-permeable gel matrix which contains a trapping component (for example, metal) being capable of trapping a metal ion. According to this invention, even when the cathode active materials (for example, copper materials) are dissolved in electrolyte so as to generate $Cu(OH)_4^{2-}$ ions, the trapping layer can reduce and/or absorb these ions, resulting in impeding diffusion of the ions to the anode and generation of metal copper by consuming the zinc that is the anode active material.

Patent Document 2 (JP Laid-open Patent Publication No. 2008-21497) has proposed an alkaline battery comprising a chelating agent, such as EDTA, blended with a cathode mixture of an alkaline battery. According to this invention, the addition of a chelating agent to the cathode mixture can form complexes of copper ions even if the ions of copper, which is a heavy metal impurity contained in manganese dioxide in the cathode mixture, arc generated by ionization from the manganese dioxide.

DISCLOSURE OF THE INVENTION

However, according to the invention of Patent Document 1, because of the gel matrix used, there is a possibility that the metals as a trapping component in the gel matrix may move to an electrode through the electrolyte so as to trap (capture) effective ions from the ionized active materials. Patent Document 2 has not described the details of a separator at all. Further, even in the invention of a Patent Document 2, some of the chelating agents diffused through the electrolyte may trap the ionized active materials form by chelate formation. In these documents, decrease in capacity of the active materials leads to lowering of discharge capacity.

Therefore, the object of the present invention is to provide a separator for alkaline batteries, even when active materials containing metal impurities are used, the separator can prevent the internal short-circuiting between the positive electrode and the negative electrode caused by the metal impurity contamination.

Another object of the present invention is to provide a separator for alkaline batteries; in addition to the above-mentioned character, the separator can capture an impurity, without suppressing the discharge performance of the battery.

Yet another object of the present invention is to provide a separator for alkaline batteries, even when the separator has chelating ability, the separator itself is capable of inhibiting dimensional change, such as expansion.

Other object of the present invention is to provide an alkaline battery equipped with such a separator for alkaline batteries.

As a result of intensive studies conducted by the inventors of the present invention to achieve the above objects, it has been found that (1) in the case where a separator is constituted from a nonwoven fabric that comprises a chelate forming fiber as at least a part of subject fibers, (2) even when metal impurities in the active materials are ionized, the subject fibers themselves can exhibit chelating ability in the nonwoven fabric so as to capture the ionized substances of the metal impurities in the separator in an efficient way, as well as (3) the subject fibers capable of forming metal chelates can be stably fixed in the separator, so as to suppress adverse effects on the active materials. Thus, the present invention has been completed.

That is, a first aspect of the present invention is an alkaline battery separator containing a nonwoven fabric, wherein the nonwoven fabric comprises subject fibers; at least a part of the subject fibers comprise a chelate forming fiber; and the chelate forming fiber has a chelate formable functional group introduced into a fiber material and is capable of forming a chelate with a metal ion.

For example, the chelate formable functional group may be an aminopolycarboxylic group. Moreover, the chelate forming fiber may be a fiber having a chelate formable functional group introduced into a cellulosic fiber. The subject fibers may comprise a chelate forming fiber and an additional fiber other than the chelate forming fiber. In such a case, the proportion of the chelate forming fiber in the nonwoven fabric may be 1 to 30% by mass (mass %).

In the above-mentioned separator, the subject fibers in the nonwoven fabric may further contain an alkaline-resistant fibrillated fiber. For example, the alkaline-resistant fibrillated fiber may comprise a cellulosic fibrillated fiber. For example, the mass ratio of chelate forming fiber to alkaline-resistant fibrillated fiber (chelate forming fiber/alkaline-resistant fibrillated fiber) may be in a range from 2/98 to 60/40.

In the above-mentioned separator, the subject fibers in the nonwoven fabric may further contain a shape retainable fiber. For example, the shape retainable fiber may comprise a polyvinyl alcohol fiber. For example, the mass ratio of chelate forming fiber to shape retainable fiber (chelate forming fiber/shape retainable fiber) may be in a range from 2/98 to 70/30.

The separator may have an impurity metal adsorption rate of, for example, 0.5 mg or higher per 1 g of separator. Moreover, the separator may have an air permeability of 1 to 500 $cc/cm^2/sec$. Further, the separator may have a thickness of 50 to 300 µm.

A second aspect of the present invention is an alkaline battery including at least a positive electrode, a negative electrode, a separator placed therebetween, and an electrolyte, wherein the separator is the above-mentioned separator.

By alkali resistant fiber according to the present invention, is meant a fiber that is not suffered from excessive dissolution and shrinkage in an alkaline electrolyte and is usable in an alkaline battery. For example, in the case where a sheet material comprising such a fiber is obtained by carried out papermaking from a fiber mixture containing 90% by weight of the alkali resistant fiber and 10% by weight of a polyvinyl alcohol fiber as a binder fiber, the sheet material has a shrinking percentage of 15% or less after being dipped into a 40% KOH aqueous solution at a temperature of 60° C. for 24 hours.

The present invention encompasses any combination of at least two features disclosed in the claims and/or the specification and/or the drawings. In particular, the present invention encompasses any combination of at least two claims.

According to the separator for alkaline batteries of the present invention, since the separator is constituted from a nonwoven fabric containing a chelate forming fiber as a subject fiber, even if using an active material containing metal impurities or contaminated with metal impurities, the separator can capture the ionized metal impurities so as to suppress the reaction between the ionized metal impurities and active materials, as well as to prevent the internal short-circuiting between the positive electrode and the negative electrode.

Where the subject fibers of the nonwoven fabric further contain an alkaline-resistant fibrillated fiber, the alkaline-resistant fibrillated fiber enables the separator to have a more densified structure, as well as enables the chelate forming fiber to be fixed more stably in the separator.

Where the subject fibers of the nonwoven fabric further contain a shape retainable fiber, even when a highly swellable chelate forming fiber is used, the shape retainable fiber can prevent the separator from excessive swelling. As a result, the amount of active materials to be filled can be maintained or further increased. Further, shrinkage of the separator can be suppressed even in the end stage of the discharge.

An alkaline battery equipped with such a separator can inhibit the internal short-circuiting of the battery, and can prolong a battery life even if metal impurities contaminate the active materials. Moreover, an alkaline battery equipped with such a separator can suppress decrease in discharge capacity caused by reaction of the active materials with metal impurities.

DESCRIPTION OF THE EMBODIMENTS

Alkaline Battery Separator

The first embodiment according to the present invention is an alkaline battery separator. The separator can retain an electrolyte while separating a positive electrode and a negative electrode electrically in an alkaline battery. The alkaline battery separator is a separator containing a nonwoven fabric, in which at least a part of subject fibers constituting the nonwoven fabric contain a chelate forming fiber into which a functional group capable of forming a chelate with a metal ion is introduced.

The form of the nonwoven fabric is not limited to a specific one as long as a chelate forming fiber can be included as at least a part of subject fibers, and may be any of a wetlaid nonwoven fabric, a drylaid nonwoven fabric (for example, a needlepunched nonwoven fabric, a thermobonded nonwoven fabric, a chemical-bonded nonwoven fabric, a stitchbonded nonwoven fabric, a hydroentangled nonwoven fabric, etc.), an airlaid nonwoven fabric, a spunlaid nonwoven fabric, a meltblown nonwoven fabric, and other nonwoven fabrics.

These nonwoven fabrics may be used singly or in combination of two or more. Among these nonwoven fabrics, preferable one includes a wetlaid nonwoven fabric in view of uniform and thin thickness of the fabric.

Chelate Forming Fiber

The chelate forming fiber is used as a subject fiber that constitutes the nonwoven fabric in the separator. All the subject fibers may be constituted from chelate forming fibers. Alternatively, a part of the subject fibers may be constituted from a chelate forming fiber(s).

The chelate forming fiber is a fiber being capable of capturing ions of impurity metals (for example, copper, nickel, cobalt, lead), especially copper ions, contained in the active materials (for example, manganese dioxide). The chelate forming fiber has a functional group being capable of forming a chelate. The functional group is introduced into a fiber molecule that constitutes a fiber material for the chelate forming fiber. The functional group being capable of forming a chelate (hereinafter referred to as chelate formable functional group) is not limited to a specific one as long as the functional group is capable of capturing an impurity metal ion (especially copper ion), and may include, for example, a polyamine group (an ethylenediamine group, a diethylenetriamine group, a hexamethylenetriamine group, a polyethyleneimine group, a polyallylamine group, etc.), an aminocarboxylic group (an iminoacetic group, an aminoacetic group, etc.), an aminopolycarboxylic group (an iminodiacetic group, a nitrilotriacetic group, an ethylenediamintriacetic group, an ethylenediaminetetraacetic group, a diethylenetriaminepentaacetic group, a triethylenetraminehexaacetic group, a glutamic acid diacetic group, an ethylenediaminedisuccinic group), a polycarboxylic group (a citric group, a tartaric group, an acrylic group, a maleic group, etc.), a hydroxylamine group (an oxime group, an amidoxime group, a glucamine group, an ethanolamine group, a hydroxamic group), a sulfur-containing group (a dithiocarbamic group, a thiourea group, an isothiourea group, a thiol group, a thiocarboxylic group), a phosphoric group (a phosphoric group, an aminophosphorus group), a phosphonate group, as well as a metal salt type (for example, an alkali metal salt type, such as a sodium salt and a potassium salt) or an ammonium salt type of these functional groups, and other functional groups. These functional groups may be used singly or in combination of two or more.

Among these functional groups, preferable one includes an amino carboxylic group and an aminopolycarboxylic group (for example, an iminodiacetic group, a nitrilotriacetic group, an ethylenediamintriacetic group, an ethylenediaminetetraacetic group, a diethylenetriaminepentaacetic group, a triethylenetetraminehexaacetic group, a glutamic acid diacetic group, and an ethylenediaminedisuccinic group).

Introduction of the chelate formable functional group to a fiber material may be carried out (I) by allowing a fiber material to react with a chelate formable compound (for example, ethylenediaminetetraacetic dianhydride) capable of exhibiting chelating ability after bonding to the fiber material; or (II) by allowing a fiber material to react with a compound having a reactive group convertible into a chelate formable functional group, and further allowing the reactive group to react with a chelate formable compound.

For example, where a chelate formable functional group is introduced by carrying out the above (II) procedure, the chelate formable functional group can be introduced into a fiber molecule in the fiber material, for example, in the presence of a redox catalyst or others, by the following step: (i) the fiber material is allowed to react with a crosslinkable compound having a plurality of crosslinkable reactive groups in a molecule, for example, a vinyl-group-containing crosslinkable compound (preferably a crosslinkable compound having both a reactive double bond and a glycidyl group therein, such as a glycidyl acrylate, a glycidyl methacrylate, and an allyl glycidyl ether) so as to introduce the crosslinkable compound into the fiber molecule, and then (ii) the glycidyl group originating from the crosslinkable compound is allowed to react with a chelate formable compound (a compound having the above-mentioned chelate formable functional group such as an iminodiacetic acid, an ethylenediaminediacetic acid, an ethylenediamintriacetic acid, an ethylenediaminetetraacetic acid, a diethylenetriaminepentaacetic acid, a glutamic acid diacetic acid, an ethylenediaminedisuccinic acid, and a phosphoric acid) so as to introduce the chelate formable functional group into the fiber molecule in the fiber material.

The introduction amount of the chelate formable functional groups in the nonwoven fabric may be suitably selected in the range that the chelate formable functional groups can capture metal impurities. For example, in accordance with the introduction rate calculated by the following formula, the introduction rate may be, for example, 0.1 mass % or more, preferably 0.5 mass % or more, and more preferably 1 mass % or more in the nonwoven fabric. Moreover, the upper limit of the introduction amount of chelate formable functional groups is not limited to a specific one as long as the nonwoven fabric can be used as a separator, and the introduction rate may be in the order of 20 mass % from the viewpoint of controlling the swellability of the separator.

$$\text{Introduction rate (mass \%)} = \left[ \frac{\begin{pmatrix} \text{Fiber mass after} & \text{Fiber mass before} \\ \text{functional group} & - & \text{functional group} \\ \text{introduction} & & \text{introduction} \end{pmatrix}}{\text{Fiber mass before functional group introduction}} \right] \times 100$$

In the formula, the functional group means all the introduced functional groups originated from the crosslinkable compound(s) and the chelate formable compound(s).

In addition, where a nonwoven fabric includes subject fiber other than a chelate forming fiber, the introduction rate of the chelate formable functional groups in a nonwoven fabric can be calculated based on the introduction rate (A: mass %) to chelate forming fiber and the blending proportion (B: mass %) of chelate forming fiber in nonwoven fabric) in accordance with the following formula:

Introduction rate (mass %)=(A/100)×B

As a fiber material, any fiber can be used as long as the fiber has alkali resistance and is allowed for introduction of a chelate formable functional group. As the preferable fiber materials, there may be mentioned a cellulosic fiber, a polyvinyl alcohol fiber, an ethylene-vinyl alcohol copolymer fiber, a polyolefinic fiber (for example, a polypropylene fiber, a polyethylene fiber, a polypropylene/polyethylene composite fiber), a polyamide fiber, a polyamide/modified-polyamide composite fiber, and other fibers. These fibers may be used singly or in combination of two or more. Although these fiber materials itself does not substantially exhibit chelate formability, by introducing a specific chelate formable group into the fiber material, the introduced chelate formable group makes it possible to capture target metal impurities, while taking advantage of the characteristics of the fiber material itself.

Among these fiber materials, cellulosic fiber is preferable. As the cellulosic fiber, there may be mentioned, for example, a vegetable fiber such as cotton, hemp, and wood; a regenerated cellulosic fiber such as a viscose rayon, a polynosic rayon, and a cuprammonium rayon; a mercerized pulp; an organic solvent-spun cellulosic fiber such as Tencel; and other cellulosic fibers. These cellulosic fibers may be used singly or in combination of two or more.

The shape of a fiber material may not be limited to a specific one as long as a chelate formation group can be introduced. The fiber material shape may be a fibrous shape, such as a continuous fiber shape and a short cut fiber shape. Alternatively, the fiber material shape may be a shape of nonwoven fabric. Moreover, if necessary, a fiber material may be a fibrillated material in which fibers or a nonwoven fabric are(is) fibrillated.

The average fiber diameter of chelate forming fibers is not limited to a specific one as long as the chelate forming fiber can constitute a separator. It should be noted that in the case where a chelate forming fiber comprises trunk portions and branch portions, the average diameter of the trunk portions is used for calculating the average fiber diameter. For example, the average fiber diameter can be selected from a wide range from 1 to 1000 µm, and may be preferably 5 to 500 µm, more preferably 10 to 300 µm, and still more preferably 10 to 150 µm. The fiber diameter can be evaluated as a fiber diameter of a true circle that is converted from the measured area of the fiber in the cross section. Moreover, the average fiber diameter can be calculated as an average value of the fiber diameters of randomly selected 20 fibers.

Moreover, where the chelate forming fiber is a short cut fiber, the fiber length of the short cut fiber may be, for example, 0.01 to 10 mm, preferably 0.03 to 5 mm, more preferably 0.05 to 1 mm, and still more preferably 0.1 to 0.8 mm from the viewpoint of achieving good handleability and fiber dispersibility in the nonwoven fabric. By shortening the fiber length of the chelate forming fiber, the surface area of the chelate forming fiber can be enlarged so as to increase adsorptive performance of the fiber.

From the viewpoint of capturing impurity metal ions in an efficient way, the preferable chelate forming fiber includes a cut fiber (short-cut fiber such as staple). For example, such a chelate formable cut fiber comprising a cellulosic fiber as a fiber material is available from Chelest Corporation, as "Chelest Fiber (registered trademark) IRY", "Chelest Fiber (registered trademark) IRY-L", "Chelest Fiber (registered trademark) IRY-LW", "Chelest Fiber (registered trademark) IRY-HW", "Chelest Fiber (registered trademark) IRY-SW", and "Chelest Fiber (registered trademark) ICP".

Since the separator according to the present invention is a nonwoven fabric comprising a chelate forming fiber as at least a part of the subject fibers, the separator can avoid exhibiting chelate formation performance outside the separator. As a result, it is possible to avoid chelate formation of the active materials. For example, the impurity-capturing performance of the separator can be enhanced by increasing the proportion of the chelate forming fibers in the nonwoven fabric.

The nonwoven fabric may include a chelate forming fiber and a fiber (additional fiber) other than the chelate forming fiber as the subject fibers. The proportion of the chelate forming fiber in the nonwoven fabric can be suitably decided according to the form of chelate forming fiber or other factors. Combination of chelate forming fibers and additional fibers in the subject fibers makes it possible to control swellability, densification, and others of the separator. From the viewpoint of exhibiting good chelating ability while controlling or maintaining swellability and densification, the proportion of the chelate forming fibers in the nonwoven fabric may be 1 to 30 mass %, and preferably 2 to 25 mass %.

Alkaline-Resistant Fibrillated Fiber

The nonwoven fabric used in the present invention may include, if necessary, an alkaline-resistant fibrillated fiber as one of the subject fibers. The presence of alkaline-resistant fibrillated fibers in the separator enables to provide a dense structure to the nonwoven fabric so as to inhibit swelling of the nonwoven fabric, as well as enables to make chelate forming fibers firmly fixed in the nonwoven fabric due to the fibrillated structure.

The alkaline-resistant fibrillated fibers may be obtained by rendering non-fibrillated fibers to be beaten or refined by a beater or a refiner. Alternatively, a fibrillated material may be obtained by rendering a nonwoven fabric that is formed in advance to hydroentangling processing and/or other processing.

The freeness value (CSF: Canadian standard freeness) of the alkaline-resistant fibrillated fiber may be 0 to 550 ml (preferably about 0 to 450 ml), and preferably about 50 to 400 ml.

The alkaline-resistant fibrillated fibers as a whole may be fibrillated. For example, the alkaline-resistant fibrillated fibers as a whole may show a predetermined freeness by combining two or more kinds (for example, 2 to 4 kinds, preferably 2 to 3 kinds, more preferably 2 kinds) of alkaline-resistant fibrillated fibers having different freeness from each other.

For example, the alkaline-resistant fibrillated fiber may comprise, for example, at least a first (high) CSF fiber (for example, a fiber having a CSF of 500 to 800 ml, preferably about 550 to 750 ml), and a second (low) CSF fiber having a CSF lower than the first CSF fiber by, for example, about 300 to 700 ml, preferably about 330 to 700 ml, and more preferably about 330 to 680 ml, in combination.

As the specific examples of the alkaline-resistant fibrillated fibers, there may be mentioned, for example, an all-aromatic polyamide fibrillated fiber, a cellulosic fibrillated fiber, and other fibrillated fibers. These alkaline-resistant fibrillated fibers may be used singly or in combination of two or more. Among these alkaline-resistant fibrillated fibers, preferable one includes a cellulosic fibrillated fiber since the cellulosic fibrillated fiber can render the chelate forming fiber to be more stably fixed in the nonwoven fabric.

As a cellulosic fiber for forming a cellulosic fibrillated fiber, there may be mentioned, for example, a regenerated cellulose fiber, a mercerized pulp, an organic solvent-spun cellulosic fiber, and other cellulosic fibrillated fibers. These cellulosic fibers may be used singly or in combination of two or more.

For example, as the regenerated cellulose fiber, there may be exemplified, for example, a viscose rayon, a polynosic rayon, a cuprammonium rayon, and other regenerated cellulose fibers.

Moreover, the mercerized pulp is a pulp obtainable from mercerization of various kinds of pulp, and there may be mentioned, for example, a hardwood pulp, a softwood pulp, eucalyptus pulp, an esparto pulp, a pineapple pulp, a Manila-hemp pulp, a sisal-hemp pulp, a cotton linter pulp, and other pulp. The pulp may be used singly or in combination of two or more.

Moreover, by an organic solvent-spun cellulosic fiber, is meant a regenerated fiber that is spun from a spinning liquid (dope) in which a cellulose from a wood pulp as a raw material is directly dissolved in an organic solvent (amine oxide etc.). The organic solvent-spun cellulosic fiber differs from the regenerated cellulose fiber in the point that the organic solvent-spun cellulosic fiber is produced by direct dissolution of cellulose in the pulp whereas the regenerated cellulose fiber is produced after obtaining a cellulose derivative.

For example, the organic solvent-spun cellulose fiber may be produced by dry-wet spinning of a dope containing amine oxide(s) and cellulose dissolved in the amine oxide(s) to obtain as-spun yarns from precipitated cellulose, followed by drawing of the yarns. A representative example of such a fiber is lyocell that is commercially available from Lenzing under the trade name of Tencel.

The mass ratio of the chelate forming fiber and the alkaline-resistant fibrillated fiber may be (chelate forming fiber/alkaline resistant fibrillated fiber)=1/99 to 70/30, preferably 2/98 to 60/40, more preferably 4/96 to 50/50, and still more preferably 6/94 to 40/60.

Shape Retainable Fiber

The nonwoven fabric used in the present invention may include, if necessary, a shape retainable fiber as one of the subject fibers. The shape retainable fiber that has a higher rigidity than that of a chelate forming fiber in an alkaline electrolyte, can suppress swelling of the nonwoven fabric caused by swelling of the chelate forming fibers, and can play a role in improving retainability of separator shape.

As the shape retainable fiber, there may be mentioned, for example, a polyvinyl alcohol fiber, an ethylene-vinyl alcohol copolymer fiber, a polyolefinic fiber (for example, a polypropylene fiber, a polyethylene fiber, a polypropylene/polyethylene composite fiber), a polyamide fiber (for example, an aliphatic polyamide fiber, an all-aromatic polyamide fiber), a polyamide/modified-polyamide composite fiber, and other shape retainable fibers. These shape retainable fibers may be used singly or in combination of two or more. Among these shape retainable fibers, preferable one includes a polyvinyl alcohol fiber since the polyvinyl alcohol fiber has good chemical resistance in an electrolyte and wettability to the electrolyte as well as excels in shape retainability.

The polyvinyl alcohol fiber preferably has a dissolution temperature in water of 90° C. or higher (for example, from about 90° C. to about 200° C.), and more preferably 100° C. or higher (for example, from about 100° C. to about 150° C.). Such polyvinyl alcohol fibers are available, for example, as vinylon subject (matrix) fibers from Kuraray Co., Ltd. If necessary, a polyvinyl alcohol fiber may be modified by acetalization or others. The polyvinyl alcohol fiber may be constituted by a vinyl alcohol polymer alone. Alternatively, the polyvinyl alcohol fiber may be a conjugate spun fiber or a blend spun fiber (e.g. an islands-in-a-sea fiber) which also contains a polymer other than a vinyl alcohol polymer.

In order to suppress swelling of chelate forming fibers, the shape retainable fiber may have a single fiber fineness of, for example, about 0.05 to about 1 dtex, preferably about 0.1 to about 0.8 dtex, and more preferably about 0.15 to about 0.6 dtex. In order to produce a uniform paper, the shape retainable fiber may have a fiber length of, for example, about 0.3 to about 10 mm, preferably about 0.5 to about 5 mm, and more preferably about 1 to about 4 mm.

The mass ratio of chelate forming fiber and shape retainable fiber may be, for example, (chelate forming fiber/shape retainable fiber)=1/99 to 70/30, preferably 2/98 to 70/30, more preferably 5/95 to 60/40, and still more preferably 8/92 to 50/50.

Alkaline-Resistant Binder Fiber

In order for the chelate fibers to exhibit chelate performance, it is important that the binder component of the alkaline-resistant binder fiber does not cover the whole surface of the chelate fibers in a wetlaid nonwoven fabric. Accordingly, preferable alkaline-resistant binder fibers include an alkaline-resistant binder fiber being capable of exhibiting a binder performance in a smaller addition amount (for example, as a solid content, 5 to 20 mass %, preferably 8 to 18 mass % in a nonwoven fabric). As the alkaline-resistant binder fiber, there may be exemplified a polyvinyl alcohol binder fiber, an ethylene-vinyl alcohol binder fiber, and other alkaline-resistant binder fibers. These binder fibers may be used singly or in combination of two or more.

In order to attain good adhesion in a small amount of the binder fiber having a small fineness, the alkaline-resistant binder fiber may have a single fiber fineness of, for example, about 0.5 to 3 dtex, and preferably about 0.7 to 2 dtex. In order to produce a uniform paper, the alkaline-resistant binder fiber may have a fiber length of, for example, about 0.3 to 10 mm, preferably about 0.5 to 5 mm, and more preferably about 1 to 4 mm.

The polyvinyl alcohol binder fiber preferably has a dissolution temperature in water of 85° C. or lower (for example, about 30 to 85° C.), particularly 80° C. or lower (for example, about 40 to 80° C.). Such polyvinyl alcohol binder fibers are available, for example, as vinylon binder fibers from Kuraray Co., Ltd. The polyvinyl alcohol binder fiber may be constituted by a vinyl alcohol polymer alone. Alternatively, a polyvinyl alcohol binder fiber may also contain an additional polymer other than the vinyl alcohol polymer.

Production Method of Separator for Alkaline Batteries

The alkaline battery separator according to the present invention can be produced by a known or common method depending on the form of the nonwoven fabric. In order to obtain a nonwoven fabric containing as a part of the subject fibers a chelate forming fiber(s), the following methods can be carried out. After preparing a nonwoven fabric, the nonwoven fabric can be used as a fiber material, and a chelate formable functional group (for example, aminopolycarboxylic group etc.) may be introduced into a fiber molecule in the fiber material by carrying out the above-mentioned method. Alternatively, after chelate forming fibers are obtained in the fiber preparation, the obtained fibers are subjected to dry- or wet-papermaking as at least a part of constitutional material of subject fibers to obtain a nonwoven fabric.

For example, when a nonwoven fabric is a wetlaid nonwoven fabric, according to one embodiment of a production method, the production method may comprise, for example, preparing a slurry containing subject fibers and optional other component(s) dispersed in water, and carrying out papermaking from the slurry.

Among these methods, from the viewpoint of producing separators efficiently, preferable production method includes preparing a slurry containing subject fibers, binder fibers, and optional other component(s), all of which are dispersed in water, wherein the subject fibers comprise a chelate forming fiber, and an alkaline-resistant fibrillated fiber and/or a shape retainable fiber; and carrying out papermaking of the above-mentioned slurry.

Examples of screens (wires) used for papermaking machines include a cylinder screen, a short screen, and a continuous screen (Fourdrinier machine). Moreover, the wetlaid nonwoven fabric may have a multilayer structure. Where a multi-layer sheet is formed, the multi-layer sheet can be formed from different slurries from each other. These screens can be used alone or as a combination of two or more.

If necessary, thus-obtained sheet by papermaking procedure may be dried by a dryer such as a Yankee dryer and/or heat-pressed. The resulting separator paper may be hydrophilically treated with a surfactant in order to improve liquid (electrolyte) absorption capacity.

Separator for Alkaline Batteries

The alkaline battery separator according to the present invention comprises at least a nonwoven fabric comprising subject fibers, in which at least a part of the subject fibers includes a chelate forming fiber. If necessary, the separator of the present invention may include one or more additional layers other than the above-mentioned nonwoven fabric, and other materials. For example, the substrate layer may be a film- or sheet-like material, and may be a nonwoven fabric that does not include a chelate forming fiber. As the nonwoven fabric, there may be mentioned a wetlaid nonwoven fabric, a drylaid nonwoven fabric (for example, a needlepunched nonwoven fabric, a thermobonded nonwoven fabric, a chemical bonded nonwoven fabric, a stitchbonded nonwoven fabric, a hydroentangled nonwoven fabric, etc.), an airlaid nonwoven fabric, a spunlaid nonwoven fabric, a meltblown nonwoven fabric, an electro-spun nonwoven fabric, and other nonwoven fabrics.

The alkaline battery separator according to the present invention may have the following properties.

Basis Weight and Thickness

The separator may have a basis weight and a thickness that can be appropriately selected according to the type of a battery for which the separator may be used. In order to achieve a reduced thickness, the separator may have a basis weight of, for example, about 15 to 50 g/m², and preferably about 20 to 45 g/m².

The separator according to the present invention may have a thickness of, for example, about 50 to 300 μm, preferably about 80 to 150 μm.

Air Permeability

From the viewpoint of lowering internal resistance of the battery, the separator may have an air permeability of, for example, about 1 to 500 cc/cm²/sec, preferably about 3 to 450 cc/cm²/sec, more preferably about 4 to 430 cc/cm²/sec, and further preferably about 5 to 400 cc/cm²/sec. Here, the term "air permeability" used herein refers to a value that can be measured by the procedures described in the below mentioned Examples.

Impurity Metal Adsorption Rate

The adsorption rate of the target impurity metal may be, based on 1 g of separator, 0.5 mg or more, preferably 1 mg or more, and more preferably 3 mg or more. Although the upper limit of the adsorption rate is not limited, the upper limit may be, for example, about 80 mg.

The adsorption amount of the impurity metal can be evaluated in accordance with the following method. First, is prepared 1 L of an aqueous metal solution (concentration 5 mmol/L) in which the target metal is liberated in the form of ion. Subsequently, after adding a sample (1 g) cut out from the separator into the above-mentioned aqueous solution and stirring at 20° C. for 20 hours, the metal ion remaining in the solution is determined. The impurity adsorption amount (mg) by 1 g of the separator sample can be accordingly evaluated as an impurity metal adsorption rate.

Liquid (Electrolyte) Absorption Capacity

The separator may have a liquid (electrolyte) absorption capacity of 4 g/g or higher, preferably 5 g/g or higher, and more preferably 5.5 g/g or higher. Although there is no specific upper limit, the liquid (electrolyte) absorption capacity of the separator is generally 20 g/g or lower. The liquid absorption capacity can be evaluated as follows. A sample of 50 mm×50 mm is immersed in a 34% KOH aqueous solution at a bath ratio of 1:100 for 30 minutes and is drained for 30 seconds without suction. Subsequently, the weight of the sample is measured. The weight of the liquid retained in the sample is divided by the weight of the pre-immersed sample to calculate liquid (electrolyte) absorption capacity.

Tensile Strength and Tensile Elongation

The separator according to the present invention may have any tensile strength and any tensile elongation depending on the material and/or the thickness of the separator, as long as the tensile strength and tensile strength of the separator do not hinder the workability of an alkaline battery. The separator may have a tensile strength of, for example, 1.5 kg/15 mm or higher (for example, 1.8 to 7 kg/15 mm), and preferably 2 kg/15 mm or higher (for example, 2 to 6 kg/15 mm). The separator may have a tensile elongation of, for example, 3 to 15%, preferably 4 to 10%. Tensile strength and tensile elongation used herein refer to values that can be measured by the procedures described in the below-mentioned Examples.

Ring Crush Strength

In order to achieve sufficient resistance against impacts such as accidental drops, a separator may have a ring crush strength of, preferably 200 g or higher, and more preferably 210 g or higher. Although there is no specific upper limit as far as improvement in impact resistance is concerned, the ring crush strength is generally 400 g or lower. Ring crush strength used herein indicates so-called "stiffness strength" of a battery separator. For example, the ring crush strength refers to a value that can be measured by the procedures described in Examples later.

Alkaline Battery

A second embodiment of the present invention is an alkaline battery containing the above-mentioned separator.

The alkaline battery (for example, a primary battery, such as an alkaline manganese battery) according to the present invention includes at least a positive electrode, a negative electrode, a separator placed between these electrodes, and an electrolyte. The positive electrode may include manganese dioxide as a cathode active material. The negative electrode may include, as a negative electrode active material, for example, zinc, zinc oxide, and other materials.

More specifically, the alkaline battery may include a negative electrode comprising a negative electrode active material, a negative current collector inserted inside the negative electrode, and a positive electrode arranged along the perimeter of the negative electrode via the separator.

Even if the active material is contaminated with impurity metal (for example, copper etc.), the separator according to the present invention can capture the impurity metals without exhibiting adverse influence on the active materials. Accordingly, an alkaline battery equipped with the separator can improve discharge performance while at the same time preventing short-circuiting, thus achieving a prolonged battery life.

The alkaline battery according to the present invention, which includes a separator having any one of the aforementioned forms, can be produced by any process or technique that is known or common in the art. Examples of the arrangement of the separator in an alkaline battery include a cross strip arrangement (i.e. a separator having a cylindrical form with closed end and crossed strips inside), a round strip arrangement (i.e. a separator having a cylindrically wound form), and a spiral strip arrangement (i.e. a separator having a spirally wound form).

EXAMPLES

Hereinafter, the present invention will be described in detail with reference to Examples, however the present invention is not limited to these Examples. Various physical properties discussed in the Examples and Comparative Examples were measured by the following procedures.

Freeness (CSF) (ml)

Canadian standard freeness was measured in accordance with "Pulps—Determination of drainability" of Japanese Industrial Standards P 8121.

Thickness (mm) and Density (g/cm³)

After standing a separator under standard environment (20° C.×65% RH) for 4 hours or longer, the thickness of the separator was measured at five places using a PEACOCK Dial-Thickness Gauge H Type (φ 10 mm×180 g/cm²). Density is calculated by dividing a basis weight by thickness.

Basis Weight (g/m²)

Basis weight was measured in accordance with "Paper and board—Determination of grammage" of Japanese Industrial Standards P 8124.

Tensile Strength and Tensile Elongation (kg/15 mm)

Tensile strength and tensile elongation were measured in accordance with "Paper and board—Determination of tensile properties" of Japanese Industrial Standards P 8113. The tensile strength is a tensile strength in the longitudinal direction. The tensile elongation is a value obtained by measuring the tensile elongation at break in the longitudinal direction.

Air Permeability ($cc/cm^2/second$)

Air permeability was measured using a Frazier type air permeability tester in accordance with "Testing method for woven fabrics—Determination of air permeability" of Japanese Industrial Standards L 1096 6.27.

Copper Adsorption Capacity (mg/1 g Separator)

A sample (1 g) cut out from the separator was added into an aqueous solution of copper sulfate (concentration: 5 mmol/L), followed by stirring the solution at 20° C. for 20 hours. Subsequently, the copper ion remaining in the solution was determined so as to evaluate the copper adsorption amount (mg) by 1 g of the separator.

Liquid (electrolyte) Absorption Capacity (g/g)

A sample of 50 mm×50 mm was immersed in a 34% KOH aqueous solution at a bath ratio of 1:100 for 30 minutes and was drained for 30 seconds without suction. Subsequently, the weight of the sample was measured. The weight of the liquid retained in the sample was divided by the weight of the pre-immersed sample to calculate liquid (electrolyte) absorption capacity.

Ring Crush Strength (g)

A separator sample (45 mm×50 mm) was rolled twice to form a double-rolled cylinder. The separator was inserted into a PP cylinder having an inner diameter φ of 8 mm and a length of 40 mm, in such a way that the transverse direction of the separator corresponds to the longitudinal direction of the cylinder. A 34% KOH aqueous solution was added into the cylinder, such that the separator in the cylinder was wetted up to 45 mm above from the bottom. Subsequently, a handy compression tester (KES-G5) produced by KATO TECH CO., LTD. was used to drop a compression plate (2 $cm^2$) at a compression velocity of 1 mm/sec. to determine a compression strength of 5 mm upper tip of the sample which was outside of the immersed area.

Battery Performance Evaluation

The battery performance evaluation method was carried out by comparing the discharge performance of the batteries each comprising a set of 20 alkaline batteries of AA (LR6). As the discharge performance, where the battery was subject to intermittent electric discharge under 3.9Ω at an ambient temperature of 20° C. for 5 minutes every day, the discharge duration of each set of the batteries was measured at the timing of the battery reached to the termination voltage of 0.9 V. The average discharge duration of a set of batteries, each comprising a positive electrode free from copper power was assumed 100 as a reference value. Where an examined battery had a discharge duration (discharge duration index) of less than 95 with respect to the reference value, the examined battery was regarded as a disqualified product. The success rate was determined from a set of 20 batteries as following criteria:

$$\text{Success rate} = \frac{\text{The number of qualified batteries (discharge duration index of 95 or higher)}}{20} \times 100$$

Example 1

(1) Preparation of Slurry

A slurry was prepared from 35% by weight (wt %) of polyvinyl alcohol subject fibers (vinylon "VPB033" manufactured by Kuraray Co., Ltd; 0.3 dtex, 3 mm), 15 wt % of polyvinyl alcohol binder fibers, (vinylon binder "VPB105-1" manufactured by Kuraray Co., Ltd; 1.1 dtex, 3 mm), 45 wt % of beaten organic solvent-spun cellulose fibers (beaten fibers of "Tencel"; 1.7 dtex, 2 mm, CSF=250 mL, manufactured by Lenzing), and 5 wt % of chelate fibers (chelate fibers "Chelest fiber IRY-HW" having iminodiacetic groups as functional groups bonded to regenerated cellulose fibers as fiber materials; fiber diameter: 100 μm, fiber length: 0.5 mm, manufactured by Chelest Corporation), all dispersed in water.

(2) Preparation of Separator Paper

A double cylinder papermaking machine capable of making a two-layer paper was used to produce a paper web. The resulting paper web was dried with a Yankee dryer to obtain an alkaline battery separator with a basis weight of 39 $g/m^2$ and a thickness of 125 μm. The liquid absorption capacity of the obtained separator was 5.98 g/g, and the ring crush strength was 300 g. The evaluation results of other physical properties are shown in Table 1.

(3) Production of Alkaline Battery

A cathode mixture comprising manganese dioxide (94.3 mass %), graphite powder (4.8 mass %), and a 40 mass % KOH aqueous solution (electrolyte) (0.9 mass %) was mixed uniformly for preparation. In this preparation, 0.003 mass % of copper powder was further added to the mixture.

Subsequently, the adjusted cathode mixture was compression-molded into a short cylindrical pellet.

On the other hand, as an anode mixture, was used a gelled anode mixture containing a polyacrylic-acid sodium (1 mass %) as a gelatinizer, a 40 mass % KOH aqueous solution (33 mass %) and zinc alloy powder (66 mass %). A battery was assembled from the cathode-mixture pellet, the gelled anode mixture, the separator, and a bottom paper (a composite of vinylon nonwoven fabric/cellophane/vinylon nonwoven fabric) so that the separator had a form of round strip (separator having a rolled cylinder), and battery performance of thus obtained battery was evaluated. The result is shown in Table 1.

Example 2

An alkaline battery separator and an alkaline battery were prepared in the same manner as those of Example 1, except for using a slurry containing 35 wt % of polyvinyl alcohol subject fibers (vinylon "VPB033" manufactured by Kuraray Co., Ltd; 0.3 dtex, 3 mm), 15 wt % of polyvinyl alcohol binder fibers (vinylon binder "VPB105-1" manufactured by Kuraray Co., Ltd; 1.1 dtex, 3 mm) 20 wt % of beaten organic solvent-spun cellulose fibers (beaten fibers of "Tencel"; 1.7 dtex, 2 mm, CSF=250 mL, manufactured by Lenzing), and 30 wt % of chelate fibers (chelate fibers "Chelest fiber IRY-HW" having iminodiacetic groups as functional groups bonded to regenerated cellulose fibers as fiber materials; fiber diameter: 100 μm, fiber length: 0.5 mm, manufactured by Chelest Corporation), all dispersed in water. The result is shown in Table 1.

Example 3

An alkaline battery separator and an alkaline battery were prepared in the same manner as those of Example 1, except for using a slurry containing 35 wt % of polyvinyl alcohol subject fibers (vinylon "VPB033" manufactured by Kuraray Co., Ltd; 0.3 dtex, 3 mm), 15 wt % of polyvinyl alcohol binder fibers (vinylon binder "VPB105-1" manufactured by Kuraray Co., Ltd; 1.1 dtex, 3 mm), 47 wt % of beaten organic solvent-spun cellulose fibers (beaten fibers of "Tencel"; 1.7 dtex, 2 mm, CSF=250 mL, manufactured by Lenzing), and 3 wt % of chelate fibers (chelate fibers "Chelest fiber IRY-HW" having iminodiacetic groups as functional groups bonded to regenerated cellulose fibers as fiber materials; fiber diameter: 100 μm, fiber length: 0.5 mm, manufactured by Chelest Corporation), all dispersed in water. The result is shown in Table 1.

Example 4

An alkaline battery separator and an alkaline battery were prepared in the same manner as those of Example 1, except for using a slurry containing 35 wt % of polyvinyl alcohol subject fibers (vinylon "VPB033" manufactured by Kuraray Co., Ltd; 0.3 dtex, 3 mm), 15 wt % of polyvinyl alcohol binder fibers (vinylon binder "VPB105-1" manufactured by Kuraray Co., Ltd; 1.1 dtex, 3 mm), 30 wt % of beaten organic solvent-spun cellulose fibers (beaten fibers of "Tencel"; 1.7 dtex, 2 mm, CSF=250 mL, manufactured by Lenzing), and 20 wt % of chelate fibers (chelate fibers "Chelest fiber IRY-HW" having iminodiacetic groups as functional groups bonded to regenerated cellulose fibers as fiber materials; fiber diameter: 100 μm, fiber length: 0.5 mm, manufactured by Chelest Corporation), all dispersed in water. The result is shown in Table 1.

Example 5

An alkaline battery separator and an alkaline battery were prepared in the same manner as those of Example 1, except for using a slurry containing 35 wt % of polyvinyl alcohol subject fibers (vinylon "VPB033" manufactured by Kuraray Co., Ltd; 0.3 dtex, 3 mm), 15 wt % of polyvinyl alcohol binder fibers (vinylon binder "VPB105-1" manufactured by Kuraray Co., Ltd; 1.1 dtex, 3 mm), 30 wt % of beaten organic solvent-spun cellulose fibers (beaten fibers of "Tencel"; 1.7 dtex, 2 mm, CSF=250 mL, manufactured by Lenzing), and 20 wt % of chelate fibers (chelate fibers "Chelest fiber 1RY-SW" having iminodiacetic groups as functional groups bonded to regenerated cellulose fibers as fiber materials; fiber diameter: 20 μm, fiber length: 0.3 mm, manufactured by Chelest Corporation), all dispersed in water. The result is shown in Table 1.

Example 6

An alkaline battery separator and an alkaline battery were prepared in the same manner as those of Example 1, except for using a slurry containing 35 wt % of polyvinyl alcohol subject fibers (vinylon "VPB033" manufactured by Kuraray Co., Ltd; 0.3 dtex, 3 mm), 15 wt % of polyvinyl alcohol binder fibers (vinylon binder "VPB 105-1" manufactured by Kuraray Co., Ltd; 1.1 dtex, 3 mm), 49.5 wt % of beaten organic solvent-spun cellulose fibers (beaten fibers of "Tencel"; 1.7 dtex, 2 mm, CSF=250 mL, manufactured by Lenzing), and 0.5 wt % of chelate fibers (chelate fibers "Chelest fiber IRY-HW" having iminodiacetic groups as functional groups bonded to regenerated cellulose fibers as fiber materials; fiber diameter: 100 μm, fiber length: 0.5 mm, manufactured by Chelest Corporation), all dispersed in water. The result is shown in Table 1.

Example 7

An alkaline battery separator was prepared in the same manner as that of Example 1, except for using a slurry containing 20 wt % of polyvinyl alcohol subject fibers (vinylon "VPB033" manufactured by Kuraray Co., Ltd; 0.3 dtex, 3 mm), 10 wt % of polyvinyl alcohol binder fibers (vinylon binder "VPB105-1" manufactured by Kuraray Co., Ltd; 1.1 dtex, 3 mm), 30 wt % of beaten organic solvent-spun cellulose fibers (beaten fibers of "Tencel"; 1.7 dtex, 2 mm, CSF=250 mL, manufactured by Lenzing), and 40 wt % of chelate fibers (chelate fibers "Chelest fiber IRY-HW" having iminodiacetic groups as functional groups bonded to regenerated cellulose fibers as fiber materials; fiber diameter: 100 μm, fiber length: 0.5 mm, manufactured by Chelest Corporation), all dispersed in water. The ring crush strength of the obtained separator was 230 g. The evaluation result of other physical properties is shown in Table 1.

Comparative Example 1

An alkaline battery separator and an alkaline battery were prepared in the same manner as that of Example 1, except for using a slurry containing 35 wt % of polyvinyl alcohol subject fibers (vinylon "VPB033" manufactured by Kuraray Co., Ltd; 0.3 dtex, 3 mm), 15 wt % of polyvinyl alcohol binder fibers (vinylon binder "VPB 105-1" manufactured by Kuraray Co., Ltd; 1.1 dtex, 3 mm), and 50 wt % of beaten organic solvent-spun cellulose fibers (beaten fibers of "Tencel"; 1.7 dtex, 2 mm, CSF=250 mL, manufactured by Lenzing), all dispersed in water. The result is shown in Table 1.

TABLE 1

|  | Ex. 1 | Ex. 2 | Ex. 3 | Ex. 4 | Ex. 5 | Ex. 6 | Ex. 7 | Com. Ex. 1 |
|---|---|---|---|---|---|---|---|---|
| Composition (mass %) | | | | | | | | |
| PVA subject fiber (VPB033) | 35 | 35 | 35 | 35 | 35 | 35 | 20 | 35 |
| PVA binder fiber (VPB105-1) | 15 | 15 | 15 | 15 | 15 | 15 | 10 | 15 |
| Tencel (beaten products: CSF250 ml) | 45 | 20 | 47 | 30 | 30 | 49.5 | 30 | 50 |
| Chelate fiber (IRY-HW: φ 100 μm × 500 μm) | 5 | 30 | 3 | 20 | — | 0.5 | 40 | — |
| Chelate fiber (IRY-SW: φ 20 μm × 300 μm) | — | — | — | — | 20 | — | — | — |
| Physical Properties | | | | | | | | |
| Basis Weight (g/m$^2$) | 39 | 39 | 39 | 39 | 39 | 39 | 39 | 39 |
| Thickness (μm) | 125 | 125 | 124 | 126 | 127 | 123 | 125 | 125 |
| Tensile strength (kg/15 mm) | 4.5 | 3.2 | 4.9 | 3.8 | 4.0 | 5.5 | 2.4 | 5.6 |
| Tensile elongation (%) | 5.8 | 6.7 | 5.9 | 5.4 | 6.9 | 5.7 | 6.2 | 6.0 |
| Air permeability (cc/cm$^2$/sec) | 5.3 | 34.6 | 4.9 | 17.2 | 14.3 | 4.4 | 38.5 | 4.4 |

TABLE 1-continued

|  | Ex. 1 | Ex. 2 | Ex. 3 | Ex. 4 | Ex. 5 | Ex. 6 | Ex. 7 | Com. Ex. 1 |
|---|---|---|---|---|---|---|---|---|
| Evaluation | | | | | | | | |
| Copper adsorption (mg) per 1 g separator | 5.3 | 30.7 | 3.3 | 20.5 | 9.1 | 0.7 | 40.9 | — |
| Success rate | 100 | 100 | 100 | 100 | 100 | 90 | 100 | 70 |

As shown in Table 1, the separators obtained in Examples 1 to 5 each containing the chelate forming fibers render the batteries in Examples 1 to 5 to attain the success rate of 100% in the battery evaluation even if copper was mixed into a cathode mixture as an impurity. Since the fibers used in these separators had alkali resistance, these separators are prevented from excessive dissolution and contraction even in the alkaline electrolyte so that the battery performance of these batteries can be successfully evaluated. On the other hand, since Comparative Example 1 did not contain a chelate forming fiber, the success rate of the battery of Comparative Example 1 has lowered to 85% where copper was mixed into a cathode mixture as an impurity.

In Example 6, probably because the amount of the chelate forming fibers in Example 6 is smaller than those in other Examples, the amount of copper adsorption per 1 g of separator is smaller than other Examples, so that the success rate of the battery of Example 6 is lower than other Examples. However, the battery of Example 6 still has the success rate higher than that of Comparative Example 1.

In Example 7, although the ring crush strength of Example 7 is lower than that of Example 1, the amount of copper adsorption per 1 g of separator is smaller than Example 1.

INDUSTRIAL APPLICABILITY

The separator for alkaline batteries according to the present invention can capture metal impurities, such as copper, by chelate formation, even if the metal impurities are intruded in active materials. The alkaline battery equipped with such a separator can attain good discharge performance while being able to suppress the internal short circuit caused by deposition of metal impurities.

Preferred embodiments of the present invention are shown and described. It is to be understood that various changes, modifications, and omissions may be made without departing from the spirit of the present invention and are encompassed in the scope of the claims.

What is claimed is:

1. An alkaline battery separator comprising a nonwoven fabric, wherein
the nonwoven fabric comprises subject fibers;
at least a part of the subject fibers comprise a chelate forming fiber;
the chelate forming fiber has a chelate formable functional group introduced into a fiber material and is capable of forming a chelate with a metal ion;
the subject fibers in the nonwoven fabric further comprise a shape retainable fiber; and
a mass ratio of the chelate forming fiber to the shape retainable fiber, chelate forming fiber/shape retainable fiber, is from 8/92 to 67/33.

2. The separator as claimed in claim 1, wherein the chelate formable functional group is an aminopolycarboxylic group.

3. The separator as claimed in claim 1, wherein the chelate forming fiber is a fiber having a chelate formable functional group introduced into a cellulosic fiber.

4. The separator as claimed in claim 1, wherein the subject fibers comprise a chelate forming fiber and an additional fiber other than the chelate forming fiber.

5. The separator as claimed in claim 1, wherein a proportion of the chelate forming fiber in the nonwoven fabric is from 1 to 30% by mass.

6. The separator as claimed in claim 1, wherein the subject fibers in the nonwoven fabric further comprise an alkaline-resistant fibrillated fiber.

7. The separator as claimed in claim 6, wherein the alkaline-resistant fibrillated fiber comprises a cellulosic fibrillated fiber.

8. The separator as claimed in claim 6, wherein the mass ratio of the chelate forming fiber to the alkaline-resistant fibrillated fiber, chelate forming fiber/alkaline-resistant fibrillated fiber, is from 2/98 to 60/40.

9. The separator as claimed in claim 1, wherein the shape retainable fiber comprises a polyvinyl alcohol fiber.

10. The separator as claimed in claim 1, wherein the separator has an impurity metal adsorption rate of 0.5 mg or higher per 1 g of the separator.

11. The separator of claim 10, wherein the impurity metal adsorption rate is a copper adsorption rate.

12. The separator as claimed in claim 1, wherein the separator has an air permeability of from 1 to 500 cc/cm$^2$/sec.

13. The separator as claimed in claim 1, wherein the separator has a thickness of from 50 to 300 μm.

14. The separator of claim 1, wherein the metal ion is at least one selected from the group consisting of copper, nickel, cobalt, and lead.

15. The separator of claim 1, wherein the shape retainable fiber comprises at least one fiber selected from the group consisting of a polyvinyl alcohol fiber, an ethylene-vinyl alcohol copolymer fiber, a polyolefinic fiber, a polyamide fiber and a polyamide/modified-polyamide composite fiber.

16. An alkaline battery comprising a positive electrode, a negative electrode, a separator placed between the positive and negative electrodes, and an electrolyte, wherein the separator is the separator of claim 1.

* * * * *